Patented Jan. 26, 1954

2,667,476

UNITED STATES PATENT OFFICE 2,667,476

METALLIZED DYES FOR COTTON

Charles H. Stratton, East Greenbush, N. Y., and William W. Williams, Easton, Pa., assignors to General Aniline & Film Corporation, New York, N. Y., a corporation of Delaware No Drawing. Application March 20, 1950, Serial No. 150,822

1 Claim. (Cl. 260—147)

The present invention relates to a copper complex of a disazo dye which is very light fast, relatively cheap to manufacture, and capable of yielding dyeings in the very valuable reddish-blue shades.

It has been known for some time that valuable blue to blue-green dyes can be made by coppering the disazo dyes produced by coupling tetrazotized dianisidine with two molecules of a naphthol such as aminonaphthol disulfonic acids, naphthol disulfonic acids, and the like.

These dyes are very light fast and relatively cheap to make. Furthermore, the shade and light fastness are retained when cloth bearing the dyeings is after-treated with a resin such as a urea-formaldehyde, melamine-formaldehyde, dicyandiamide-formaldehyde, and the like. These resins are applied for various purposes, as for instance, creaseproofing, imparting stiffness, water repellency, and the like.

One of the most valuable classes of blue dyes required at the present time are those which are capable of yielding dyeings in a reddish-blue shade. The older dyes, although possessing many advantages, suffer from the fact that the dyeings obtained therewith are only of a blue to blue-green shade.

It has now been discovered that a copper complex dye obtained by tetrazotizing dianisidine and coupling the resulting tetrazo compound with 1 mol of a naphthol disulfonic acid and with 1 mol of a pyrazolone containing a methyl group in the 3-position, yield dyeings of a very pleasing reddish-blue shade. Such complex has the further advantage that it is cheaper to manufacture than the known dyes and gives a favorable response to after-treatment with resins derived from formaldehyde and an organic compound containing an amino group such as urea, melamine, dicyandiamine or thiourea.

Such complex and its preparation constitute the purposes and objects of the present invention.

The copper complex which is contemplated herein may be typified by the following structural formula:

The dye which is coppered to yield the complex is made by tetrazotizing dianisidine with sodium nitrite and hydrochloric acid at a temperature below 10° C., adding alkali such as sodium bicarbonate to the reaction mixture for the purpose of neutralizing excess acid, adding the desired naphthol disulfonic acid while maintaining the temperature below 10° C. and pouring the resulting solution into a solution of the desired pyrazolone rendered alkaline, as for example with sodium carbonate, while cooling to below 10° C.

The dye may also be made by first coupling with the pyrazolone and then with the naphthol disulfonic acid. However, the first named procedure is preferred since it is found that the yields are better when first coupling is with the naphthol disulfonic acid.

The naphthol which is utilized for the first coupling is 2-naphthol-3,6-disulfonic acid.

Illustrative of the pyrazolone which we have found to be suitable is m-(4,5-dihydro-3-methyl-5-oxo-1-pyrazolyl)-benzene sulfonic acid.

For effecting metallization of the dye prepared as above, a paste of the dye selected is re-sludged with water, ammonium hydroxide and copper sulfate at a temperature of about 50 to 120° C.

The dye is isolated by salting out, filtering and drying to yield a powder.

The following example will serve to ilustrate the invention claimed.

*Example.—Tetrazotization of dianisidine*

130 ml. of water containing 1 gram of the sodium salt of di-n-butyl naphthalene sulfonic acid is heated to 95° C. 10 ml. of concentrated hydrochloric acid (36%) is then added. The temperature rises 2°.

The solution is vigorously stirred while rapidly adding 12.2 grams (.05 mol) of dianisidine. The solution is stirred until the dianisidine completely dissolves. The stirring is continued while 200 grams of finely chopped ice is added, as a result of which the temperature falls to 0 to 5° C.

24 ml. of concentrated hydrochloric acid is then added. Should the temperature rise above

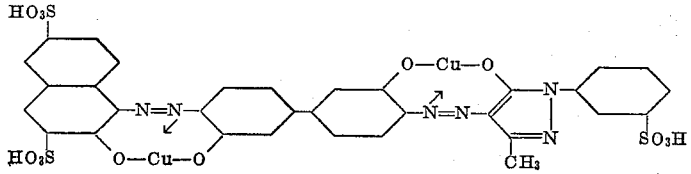

5° C., more ice is added to bring the temperature below 5° C.

7.1 grams of sodium nitrite as a roughly 30% solution (23.6 ml.) is added dropwise to the solution over a period of 30 minutes. The solution is stirred and kept below 5° C. for an additional half hour. The excess nitrous acid is destroyed with a little sulfamic acid. The mixture is now ready for the first coupling operation.

First coupling

The excess acid is destroyed by cautiously adding 21 grams of sodium bicarbonate. The slow addition of the bicarbonate is necessary in order to avoid excessive foam. The solution at this stage should be acid to brilliant yellow paper but alkaline to delta paper. The latter is a paper impregnated with a dyestuff (2,4-dinitroaniline diazotized and coupled with 1-naphthol-3,6-disulfonic acid) which changes from yellow to blue in the pH range of 6 to 7.

The solution is stirred and maintained below 5° C. while a solution of 21 grams of 2-naphthol-3,6-disulfonic acid (.0504 mol) and 100 ml. of water is added dropwise in the course of an hour. More alkali must be added to complete the coupling, and ordinarily 5 grams of sodium bicarbonate will suffice.

The progress of the coupling can be readily followed. A drop of the reaction mixture is placed on filter paper. The insoluble half-coupled product remains in the center while the soluble components are carried with the water as it spreads. Unreacted dianisidine tetrazo may be detected with an alkaline H-acid solution while R salt may be detected with any diazo solution. If the rim is colored, it means that coupling is actively taking place in the solution. At the conclusion of the reaction, ordinarily 30 minutes after the addition of the last of the R salt, the rim should be practically colorless and give none or only a very faint test for dianisidine tetrazo. A very slight excess of R salt is permissible.

Second coupling

The half-coupled material is poured into a solution of 25.4 grams of m-(4,5-dihydro-3-methyl-5-oxo-1-pyrazolyl)-benzene sulfonic acid (.055 mol) in 100 ml. of water and 100 ml. of 20% sodium carbonate solution which has been externally cooled to 0–5° C. The mixture is packed in ice and stirred overnight. The dye is filtered without further manipulation. The filtration is clean and fast, yielding 116 grams of dye paste.

Metallization

The paste is resludged with 600 ml. of water and then placed in a 2000 ml., 3-necked flask equipped with a motor driven stirrer, a water-cooled condenser and a thermometer. 100 ml. of concentrated ammonium hydroxide (28.8%) is then stirred into the mixture.

A solution of 33 grams of hydrated copper sulfate (.135 mol) in 80 ml. of water is added, bringing the total volume to 1100 ml. The temperature is raised to 85° C. and held there for 37 hours while continuously stirring.

220 grams of salt is added and the product is filtered at 70° C. The paste, amounting to 296 grams, is dried at 85° C. to yield 96.2 grams of powder.

Dyeings 100 parts of cotton cloth is wetted out and immersed in a dye bath containing 2000 parts of water and 2 parts of direct copper dyestuff prepared as above. The temperature is raised to 95° C. and held there for 45 minutes while 20 parts of salt is added to assist the exhaustion of the dyestuff. The dyed cloth is then rinsed and dried.

A level reddish-blue shade of excellent fastness to light is obtained. The dye has excellent substantivity to cellulosic fibers and exhausts the dyebath almost completely.

Modifications of the invention will occur to persons skilled in the art, and we, therefore, do not intend to be limited in the patent granted except as necessitated by the appended claim.

We claim:

The dye substantive to cotton of the following structure:

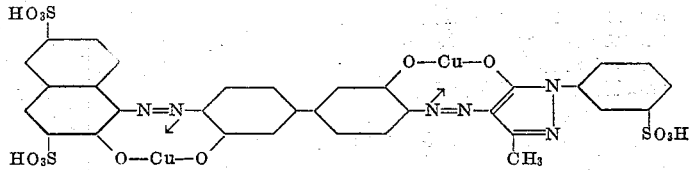

CHARLES H. STRATTON.
WILLIAM W. WILLIAMS.

References Cited in the file of this patent

UNITED STATES PATENTS

| Number | Name | Date |
|---|---|---|
| 2,034,668 | Reindel | Mar. 17, 1936 |
| 2,428,130 | Straub | Sept. 30, 1947 |
| 2,476,259 | Mayer et al. | July 12, 1949 |
| 2,553,011 | Schedler et al. | May 15, 1951 |

FOREIGN PATENTS

| Number | Country | Date |
|---|---|---|
| 502,677 | Great Britain | Mar. 21, 1939 |